United States Patent [19]
Hargreaves et al.

[11] Patent Number: 5,584,321
[45] Date of Patent: Dec. 17, 1996

[54] GAS PRESSURE CONTROL APPARATUS

[75] Inventors: Alan G. Hargreaves; David Swallow; Peter J. Woodford, all of Surrey, Great Britain

[73] Assignee: International Gas Apparatus Ltd., Surrey, United Kingdom

[21] Appl. No.: 232,148

[22] PCT Filed: Nov. 3, 1992

[86] PCT No.: PCT/GB92/02024

§ 371 Date: Jun. 17, 1994

§ 102(e) Date: Jun. 17, 1994

[87] PCT Pub. No.: WO93/09483

PCT Pub. Date: May 13, 1993

[30] Foreign Application Priority Data

Nov. 5, 1991 [GB] United Kingdom ............. 9123469

[51] Int. Cl.$^6$ ........................... F16K 31/36
[52] U.S. Cl. ......................... 137/613; 137/487.5
[58] Field of Search ................... 137/487.5, 613

[56] References Cited

U.S. PATENT DOCUMENTS 2,737,197  3/1956  Jaseph ........................... 137/487
4,565,212  1/1986  Klein et al. ..................... 137/487.5
4,791,954  12/1988  Hasegawa ........................ 137/487.5
5,220,940  6/1993  Palmer .......................... 137/487.5

FOREIGN PATENT DOCUMENTS 0473264  3/1992  European Pat. Off. .
2024650  1/1980  United Kingdom .

*Primary Examiner*—A. Michael Chambers
*Attorney, Agent, or Firm*—Lowe, Price, LeBlanc & Becker

[57] ABSTRACT

Gas pressure control apparatus comprises a pressure body having a lid at the top, and divided into an inlet chamber partially bounded by the lid and communicating through a port with an outlet chamber. The inlet chamber contains a valve stack including a slam-shut valve and a pair of pressure regulating valves. The valve stack is held together by bolts, and is mounted on the lid by the bolts sliding through holes in a disc forming part of the lid. Springs urge the valve stack against the port in an essentially planar manner to maintain a good seal between the valve stack and the port.

9 Claims, 1 Drawing Sheet

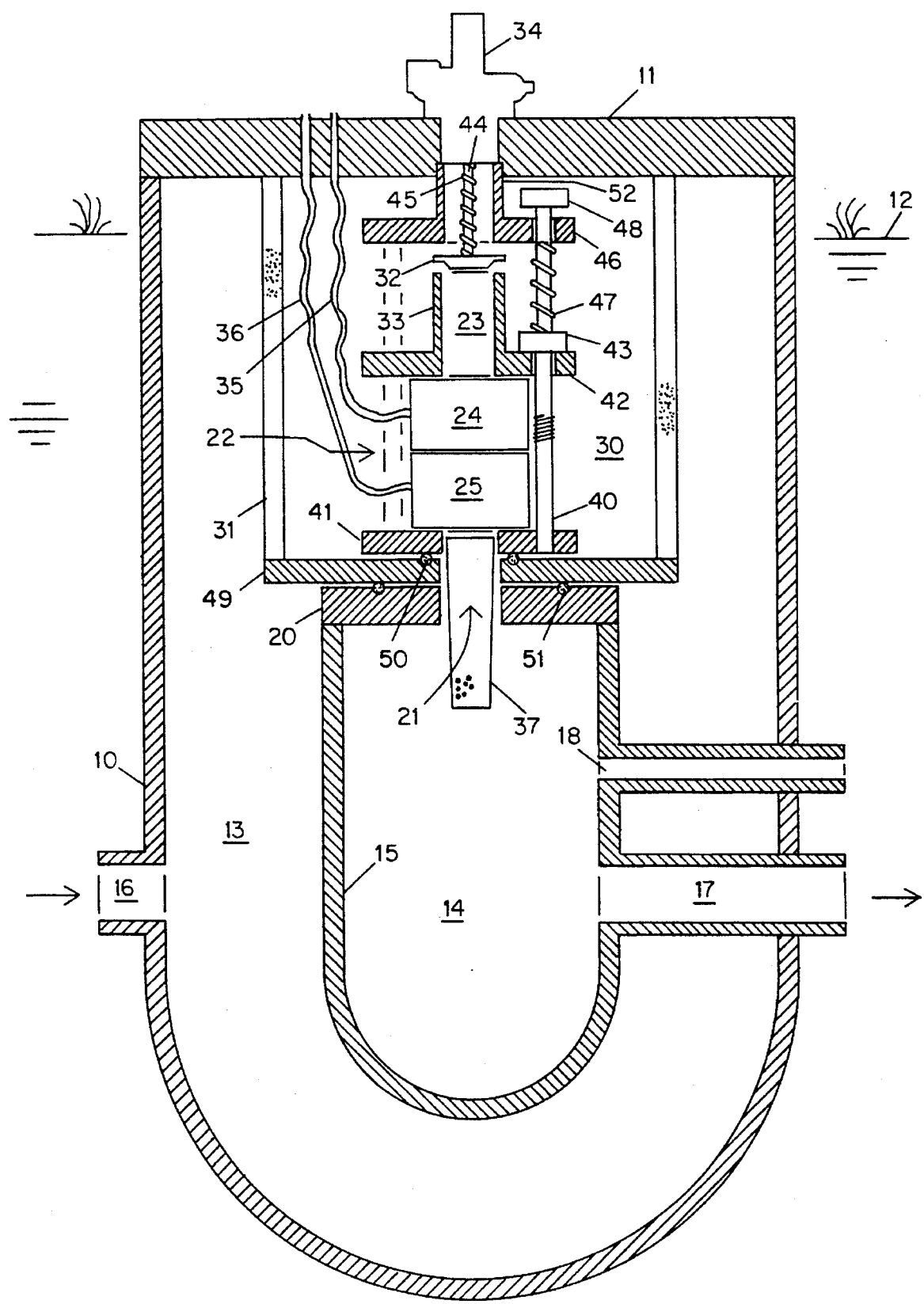

GAS PRESSURE CONTROL APPARATUS

TECHNICAL FIELD

The present invention relates to control installations for gas transmission and distribution systems, and particularly to apparatus for reducing and controlling the pressure and/or flow of gas in a pipeline.

BACKGROUND ART

In a gas transmission and distribution system, gas (i.e. fuel gas) is normally transmitted at high pressure, but has to be distributed to end users through local networks at a pressure which is relatively low and is also controlled fairly accurately. A pressure reducing station is therefore required for coupling the high-pressure transmission line to the local distribution network.

Conventionally, a pressure reducing station comprises two streams in parallel, each stream containing an initial isolating valve, slam-shut valve, a suitable number of pressure regulating (reducing) valves depending on the amount of pressure reduction required, and a final isolating valve. A typical example of such a station is shown in our GB 2 217 877 A. Such a station is normally located above ground, and the fact that the various valves in each stream are arranged in a linear sequence means that it normally occupies a good deal of space.

There has recently been increasing interest in the possibility of pressure reducing stations which are largely buried. A buried station has various advantages: it is relatively unobtrusive, the liability of accidental or deliberate damage to it is reduced, and the noise emission from it is reduced.

A buried station naturally requires a hole or pit to be dug, and it is desirable to minimize the size of this pit. A somewhat different design has therefore been developed for buried pressure reducing stations. The basic feature of a buried pressure reducing station, in its current form, is a pair of pressure chambers, an inlet chamber and an outlet chamber. The inlet chamber usually includes a filter, end communicates with the outlet chamber through a valve stack (a valve assembly or cartridge) including a slam-shut valve and a suitable number of pressure regulating valves.

Various specific designs for such stations are known. The two chambers may be physically separate units located adjacent to each other, or they may be separate units but located in a common outer enclosure. More usually, however, they are separate regions of a single pressure body divided by internal walls. It is also common for such stations to be largely buried, as discussed above.

The valve stack has controls which have to be accessible from outside the chamber. In addition, the valve stack requires servicing at suitable intervals. The design of the station should therefore be such as to make the valve stack easily accessible. This is commonly achieved by locating the chamber containing the valve stack towards the top of the pressure vessel and providing it with a lid which can be removed to provide access to the valve stack. This chamber therefore typically has a port or opening in its base with which the valve stack fits. The chamber containing the valve stack may be either the inlet or the outlet chamber.

The valve stack obviously has to have a good seal to the port between the two chambers, to prevent the escape of high-pressure gas through that port directly to the outlet.

It would be possible to bolt the valve stack directly to the chamber wall surrounding the port. However, this would require access to the bottom of the chamber to release the valve stack, and this would generally be difficult. Some other sealing technique is therefore required.

A technique for achieving such a seal is to form the port and the mating end of the valve stack as accurately formed cylindrical surfaces, with one of them including a suitable seal (such as an O ring). The valve stack is attached to the lid of the chamber, and after servicing, the combined lid and valve stack is lowered into the chamber, with the bottom end of the valve stack being inserted into the port. The lid can then be locked in position, so locating the valve stack in position. An example of this technique, which can be described as a piston-type seal, is the system described in GB 2 024 650 A.

This technique has various drawbacks. The seal between the valve stack and the port is expensive and difficult to maintain, and it is difficult to monitor the insertion of the valve stack into the port and avoid damage to the sealing parts of the valve stack and/or the port. Further, such a piston-type seal requires a substantial clearance between the two parts being sealed together, to accommodate the O sealing ring; hence if any damage (eg mechanical or chemical) occurs to the sealing ring causing it to disintegrate, a leakage path of substantial size will result.

The general object of the present invention is to provide an improved technique for sealing a valve stack to a port, particularly a port in a pressure reducing station.

SUMMARY OF THE INVENTION

The crux of the present invention lies in mating the valve stack with the port in an essentially planar manner end spring loading the valve stack from the lid. A good seal is thereby maintained between the valve stack and the port.

Accordingly the present invention provides gas pressure control apparatus comprising a pressure body having a removable lid and a divider substantially parallel with the lid dividing the body into a first chamber bounded by the lid and a second chamber communicating with the first chamber through a port forming part of the divider, the first chamber containing a valve stack including a slam-shut valve and at least one pressure regulating valve, the valve stack mating with the port in the divider, characterized in that the valve stack is mounted on the lid and is spring urged into planar (abutting) sealing engagement with the divider. The sealing engagement may be direct from the valve stack to the divider, or it may be indirect from the valve stack to an intermediate plate parallel to the divider and from the plate to the divider, with planar (abutting) seals between the valve stack and the intermediate plate and between the intermediate plate and the divider.

BRIEF DESCRIPTION OF THE DRAWINGS

FIG. 1 is a schematic cross-sectional view of a gas pressure control apparatus in a gas transmission and distribution system according to the present invention.

BEST MODE FOR CARRYING OUT THE INVENTION

The station comprises a pressure vessel 10 closed by a lid 11; this pressure vessel may be mostly buried below ground level 12. Internally, it contains an inlet chamber 13 and an outlet chamber 14, divided from each other by an internal wall 15. There is a single inlet 16 to the inlet chamber, while the outlet chamber has a main outlet 17 and a subsidiary outlet 18, which may be used eg for providing access to outlet chamber 14 to sense the pressure therein. The pressure body 10 is in the form of a cylinder with a rounded end and the second chamber 14 is in the form of a cylinder with a rounded end contained wholly within the pressure body 10.

The outlet chamber 14 is closed at the top by a divider 20 which has a port 21 in it. A valve stack 22 is held in sealing contact with the port 21, and provides a communicating path from the inlet chamber 13 to the outlet chamber 14. More precisely, the inlet chamber 13 has an inner space 30 separated from its main volume by a filter 31, which filters out any particulate impurities in the gas. The slam-shut valve 23 has a closure member 32 and a seating 33; the valve is normally open, allowing gas to pass from the inner space 30 of the inlet chamber into the top of the valve stack 22.

The valve stack consists of a slam-shut valve 23 and two regulating valves 24 and 25 connected in series. The slam-shut valve is normally open, and is controlled by control means 34 located above the lid 11 to close and so cut off all flow of gas through the station eg in the event of some serious fault in the distribution system. The regulating valves 24 and 25 are controlled by flexible control lines 35 and 36 to control the flow of gas through the station, these control lines being fed by further control means (not shown) located outside the pressure vessel, e.g. attached to the top of the lid 11. In general, the control means sense the pressure in the distribution system fed from the outlet 17 and adjust the regulating valve to maintain this pressure constant.

More specifically, the pressure of the distribution system downstream from outlet 17 is sensed via subsidiary outlet 18 by means of a conventional pressure sensor, not shown, and communicated to the control means. The control means adjusts the regulating valve 25 to maintain this pressure steady. Regulator valve 25 is the primary working valve, used to control the flow through the system and thus the outlet pressure. Valve 24 is a monitor or back-up valve which is normally fully open and is used only if the primary regulator valve fails to control the outlet pressure adequate. Thus, should a fault develop with regulating valve 25 which results in the distribution system pressure in chamber 14 and outlet 17 increasing, the control means will sense this increase and bring regulating valve 24 into control as a safety override. The slam-shut valve 23 is a second safety device and will be used only if both regulator valves 24, 25 fail, i.e., fail to stop the flow when required.

The regulating valves form part of a normal pressure control system. This control system operates in a continuous manner responsive to continuous changes in both inlet and outlet conditions, with the valves themselves operating sequentially. If the inlet pressure rises, the valves close slightly to stop the outlet pressure from rising; if the load demand on the outlet rises, the outlet pressure will tend to fall, and the valves open slightly to keep the pressure up. The outlet pressure is sensed via subsidiary outlet 18. It is not necessary to sense the inlet pressure, as standard control techniques can be used to adjust the valve positions according to the outlet pressure until the outlet pressure is brought to the desired valve.

The regulating valves may be of any convenient type, e.g. diaphragm valves or axial flow valves (wafer valves).

A diffuser 37 is mounted in and projects through the port 21 into the outlet chamber 14, and diffuses the gas entering that chamber via the valve stack and the port.

The valve stack is held together by a set of bolts 40 (only one of which is shown). The two regulating valves 24 and 25 are held between a pair of discs 41 and 42, with the bolts 40 engaging with threaded holes in disc 41 and nuts 43 being tightened to hold the regulating valves 24 and 25 and the discs 41 and 42 as a rigid assembly. There are conventional gaskets (not shown) between the various valves of the valve stack.

The seating 33 of the slam-shut valve 23 is attached to the disc 42. The closure member 32 of the slam-shut valve has a shaft 44 which extends through the lid 11 to the slam-shut control means 34. A spring 45 is in compression between the lower end of the slam-shut control means 34 and the closure member 32 of the slam-shut valve. This slam-shut valve is urged closed by this spring, and is normally held open against the spring force by the control means 34 holding the shaft 44 upwards.

The valve stack is held on the underside of the lid 11 by means of a plate 46, which has an upwards extension 52 welded to the lid 11. The bolts 40 can slide freely through the plate 46; the valve stack is urged downwards by springs 47 on the bolts, and its downward travel is limited by nuts 48 at the top of the bolts.

When the station is being assembled, the lid 11 is initially off the pressure vessel 10, and the valve stack 22 is at the lower limit of its travel away from the lid. The lid and valve stack assembly is lowered into position in the pressure vessel, so that the bottom disc 41 of the valve stack rests on the top 20 of the outlet chamber 14, with a seal between them.

In point of fact, the disc 41 does not rest directly on the chamber top 20. There is a further plate 49 between them, carrying the filter 31, and there is a seal 50 between disc 41 and plate 49 and a seal 51 between plate 49 and chamber top 20. However, this does not affect the principles involved.

The plate 49 may be bolted to the top 20 of the inner chamber 14 if desired. The upper end of the diffuser 37 can conveniently project upwards above the level of the top of this plate and engage with the lower end of the valve stack 22, to assist in locating the valve stack.

Once the lid and valve stack assembly has been positioned, the lid is then lowered further to engage with the rim of the vessel 10 and locked thereto in a conventional manner. This forces the plate 46 to move downwards on the bolts 40, compressing the springs 47 and so compressing the seals 50 and 51. The inlet and outlet chambers are thus sealed from each other, with the only communication between them being via the valve stack 22.

The sliding of plate 46 down the bolts involves relative movement between the control means 34 of the slam-shut valve 23 and the seating 33 of this valve. However, the operation of this valve is not effected by this, because this valve is an on-off valve. In one position, the chamber member 32 is in the up position, far enough from the seating 33 for the flow of gas through it to be uneffected by the precise position of the closure member relative to the seating; and in the other position, the closure member is lowered into engagement with the seating, and this is also uneffected by the precise distance through which it has to travel for this.

It will be appreciated, upon review of the description herein, that the flow path of gas through the pressure vessel 10 is as follows. Gas enters the inlet chamber 13 via inlet 16. The gas encounters filter 31, which filters out any particular impurities in the gas. After emanating from filter 31, gas enters the normally open slam-shut valve 23, flows through regulating valves 24 and 25, through port 21 in divider 20 to outlet chamber 14, then exits the pressure vessel 10 by means of main outlet 17.

We claim:

1. Gas pressure control apparatus comprising a pressure body (10) having a removable lid (11) and a divider (2) substantially parallel with the lid dividing the body into a first chamber (13) bounded by the lid (11) and including an inlet port receiving gas and a second chamber (14) communicating with the first chamber through a port (21) forming part of the divider (20) and including an outlet port through which gas exits from the pressure body (10), the first chamber including a seal comprising a valve stack (22) including a slam-shut valve (23) and at least one pressure regulating valve (24, 25), the valve stack (22) mating with the port (21) in the divider (20), wherein the valve stack (22) is mounted on the lid (11) and is spring urged (at 47) into planar (abutting) sealing engagement with the divider (20).

2. Gas pressure control apparatus according to claim 1 wherein the first chamber (13) is an inlet chamber and the second chamber (14) is an outlet chamber.

3. Gas pressure control apparatus according to claim 1 wherein a plurality of bolts (40) which hold together the valves (23, 24, 25) of the valve stack (22) and which extend beyond the valve stack (22) towards the lid (11) and have springs (47) thereon which perform the spring urging.

4. Gas pressure control apparatus according to claim 3 wherein the bolts (40) are held captive on a disc (46) attached to the lid (11) and against which the springs (47) bear.

5. Gas pressure control apparatus according to claim 1 wherein the valve stack (22) includes a diffuser (37) projecting through the port (21).

6. Gas pressure control apparatus according to claim 1 wherein a filter (31) surrounding the valve stack (22).

7. Gas pressure control apparatus according to claim 6 wherein the filter (31) is closed by a plate (49) held in planar sealing engagement between the valve stack (22) and the port (21).

8. Gas pressure control apparatus according to claim 1 wherein the pressure body (10) is in the form of a cylinder with a rounded end and the second chamber (14) is in the form of a cylinder with a rounded end contained wholly within the pressure body (10).

9. A seal for un underground gas pressure control apparatus including a pressure body (10) having a removable lid (11) and a divider (2) substantially parallel with the lid dividing the body into a first chamber (13) bounded by the lid (11) and including an inlet port receiving gas and a second chamber (14) communicating with the first chamber through a port (21) forming part of the divider (20) and including an outlet port through which gas exits from the pressure body (10), the seal comprising a valve stack (22) disposed in the first chamber and including a slam-shut valve (23) and at least one pressure regulating valve (24, 25), the valve stack (22) mating with the port (21) in the divider (20) and mounted on the lid (11) and is spring urged (at 47) into planar (abutting) sealing engagement with the divider (20).

* * * * *